(12) United States Patent
Dusterhoft et al.

(10) Patent No.: US 7,992,656 B2
(45) Date of Patent: Aug. 9, 2011

(54) SELF HEALING FILTER-CAKE REMOVAL SYSTEM FOR OPEN HOLE COMPLETIONS

(75) Inventors: Ronald G. Dusterhoft, Katy, TX (US); Andrew D. Penno, Sehndo (DE)

(73) Assignee: Halliburton Energy Services, Inc., Duncan, OK (US)

( * ) Notice: Subject to any disclaimer, the term of this patent is extended or adjusted under 35 U.S.C. 154(b) by 159 days.

(21) Appl. No.: 12/459,942

(22) Filed: Jul. 9, 2009

(65) Prior Publication Data

US 2011/0005773 A1 Jan. 13, 2011

(51) Int. Cl.
*C08B 37/00* (2006.01)
(52) U.S. Cl. .......................................... 175/72; 507/110
(58) Field of Classification Search .................... 175/72; 507/110

See application file for complete search history.

(56) References Cited

U.S. PATENT DOCUMENTS

| | | | |
|---|---|---|---|
| 6,422,314 B1 | 7/2002 | Todd et al. | |
| 6,494,263 B2 | 12/2002 | Todd | |
| 6,737,385 B2 | 5/2004 | Todd et al. | |
| 7,117,942 B2 | 10/2006 | Dalrymple et al. | |
| 7,678,742 B2 * | 3/2010 | Munoz et al. | 507/110 |
| 7,678,743 B2 * | 3/2010 | Munoz et al. | 507/110 |
| 7,687,438 B2 * | 3/2010 | Munoz et al. | 507/110 |
| 2005/0194140 A1 | 9/2005 | Dalrymple et al. | |
| 2006/0016596 A1 | 1/2006 | Pauls et al. | |
| 2006/0137875 A1 | 6/2006 | Dusterhoft et al. | |
| 2006/0266522 A1 | 11/2006 | Eoff et al. | |
| 2006/0283592 A1 | 12/2006 | Sierra et al. | |
| 2007/0078064 A1 | 4/2007 | Munoz et al. | |
| 2008/0070806 A1 * | 3/2008 | Lin et al. | 507/110 |
| 2008/0070807 A1 * | 3/2008 | Munoz et al. | 507/117 |
| 2008/0070808 A1 * | 3/2008 | Munoz et al. | 507/117 |
| 2010/0048429 A1 * | 2/2010 | Dobson et al. | 507/212 |

FOREIGN PATENT DOCUMENTS

| | | |
|---|---|---|
| EP | 1 619 351 A1 | 1/2006 |
| WO | WO2005/071219 A3 | 8/2005 |
| WO | WO2010/097573 A1 | 9/2010 |

OTHER PUBLICATIONS

International Search Report and Written Opinion for PCT/GB2010/001312 dated Oct. 13, 2010.

* cited by examiner

*Primary Examiner* — William P Neuder
(74) *Attorney, Agent, or Firm* — Robert A. Kent; McDermott, Will & Emery LLP

(57) ABSTRACT

A method of treating a subterranean formation including providing a well bore that includes a filter cake on at least a portion of the well bore and contacting at least a portion of the filter cake with a filter cake degradation fluid comprising a relative permeability modifier. The method also includes allowing the relative permeability modifier to retain at least a portion of the filter cake degradation fluid in the well bore for a time sufficient to contact the filtercake and allowing the filter cake to degrade.

20 Claims, No Drawings

SELF HEALING FILTER-CAKE REMOVAL SYSTEM FOR OPEN HOLE COMPLETIONS

BACKGROUND

The present invention relates to well drilling and servicing fluids utilized in producing and injecting formations and the removal of filter cake deposited by the fluids.

Drilling and servicing fluids may be used to produce hydrocarbon formations penetrated by well bores. The drilling fluids may be utilized when well bores are drilled into producing or injecting formations to minimize damage to the permeability of the formations and their ability to produce hydrocarbons and or accept injected fluids or gas. Servicing fluids may be utilized when completion operations are conducted in formations and when conducting work-over operations in the formations. The drilling and servicing fluids may deposit filter cake on the walls of the well bore within a formation, which may prevent the drilling and servicing fluids from being lost into the formation and may prevent solids from entering the porosities of the formation. After the drilling or servicing of a formation has been completed, the filter cake may be removed prior to placing the formation on production or injection.

The removal of the filter cake may be accomplished by including an acid soluble bridging agent in the drilling or servicing fluid for bridging over the formation pores. The filter cake formed by the drilling or servicing fluid, which may include the bridging agent and a polymeric suspending agent, may be contacted with a strongly acidic solution, and the acidic solution may be allowed to remain in contact with the filter cake for a period of time sufficient to degrade the filter cake. In spite of efforts to avoid it, the strongly acidic solution may corrode metallic surfaces and completion equipment, such as sand screens, leading to their early failure, and may present handling concerns. The acidic solution may also be incompatible with the permeable formation and may cause damage thereto.

Water soluble particulate solid bridging agents may also be used in drilling or servicing fluids, and the filter cake containing the water soluble bridging agent may be contacted with an aqueous salt solution which may be undersaturated with respect to the water soluble bridging particles. However, such undersaturated aqueous solutions may require a relatively long period of time to dissolve the particles, at least partially due to the polymeric suspending agents included in the drilling or servicing fluids. That is, the polymer or polymers present in the filter cake may shield the water soluble bridging particles from the aqueous solution.

Many of the problems associated with filter cake removal may be present in both cased and open hole completions. For open hole completions, the removal of the bridging agent may lead to uncontrolled fluid losses into the formation along the completion interval. Such losses may not only result in damage to the formation due to intrusion of the treatment fluids, but also may result in limited break through of the filter cake clean-up fluid in only a small portion of the interval leading to large volumes of fluid escaping through the limited break. The fluid loss may lead to large portions of the interval and filter cake remaining untreated. The filter cake left behind due to the diversion of the filter cake clean-up fluid may result in a decreased flow rate through some sections, ultimately leading to a decrease in production from or injection into the well.

SUMMARY

The present invention relates to well drilling and servicing fluids utilized in producing and injecting formations and the removal of filter cake deposited by the fluids.

An embodiment provides a method of treating a subterranean formation comprising: providing a well bore that includes a filter cake on at least a portion of the well bore, contacting at least a portion of the filter cake with a filter cake degradation fluid comprising a relative permeability modifier, allowing the relative permeability modifier to retain at least a portion of the filter cake degradation fluid in the well bore for a time sufficient to contact the filtercake, and allowing the filter cake to degrade.

Another embodiment provides a method of degrading a filter cake in a subterranean formation comprising: contacting at least a portion of a filter cake with a filter cake degradation fluid comprising a relative permeability modifier; and allowing the filter cake to degrade.

Yet another embodiment provides a method of drilling a well bore comprising: using a drilling fluid to drill a well bore in a subterranean formation; permitting the drilling fluid to establish a filter cake in at least a portion of the well bore; contacting at least a portion of the filter cake with a filter cake degradation fluid comprising a relative permeability modifier; and permitting the filter cake to degrade.

The features and advantages of the present invention will be apparent to those skilled in the art. While numerous changes may be made by those skilled in the art, such changes are within the spirit of the invention.

DESCRIPTION OF THE PREFERRED EMBODIMENTS

The present invention relates to well drilling and servicing fluids utilized in producing and injecting formations and the removal of filter cake deposited by the fluids.

The filter cake removal system may have many advantages only some of which will be discussed herein. The filter cake removal system disclosed herein may be used to remove a filter cake from a well bore while at the same time containing a fluid loss control agent to limit or prevent fluid losses into the formation. The fluid loss control agent in the filter cake degradation fluid may prevent uncontrolled fluid loss in any portion of the exposed well interval as the filter cake is removed so as to allow the filter cake degradation fluid to degrade the filter cake along an entire completion interval. As used herein, the terms "degrade" and "degradation" (and their derivatives) refer to the loss of filter cake properties, as measured by an increase in the permeability between a fluid in a well bore and the formation with higher degrees of degradation. In an embodiment, the fluid loss control agent in the filter cake degradation fluid may be a water soluble relative permeability modifier that may prevent losses of aqueous fluids into the reservoir, but allow the well to produce hydrocarbons without being removed in a subsequent treatment operation. The use of the relative permeability modifier may also allow a filter cake to be substantially removed from an open hole completion. As used herein, an "open hole completion" refers to a well completion that has no casing or liner set across the reservoir formation over an interval, allowing the produced fluids to flow directly into the well bore. Without any casing or liner installed, selective treatments or remedial work within the open hole reservoir section are more difficult as long sections of the well bore may be exposed during treatment operations. The relative permeability modifier may act to prevent or limit the flow of aqueous fluids into the formation and keep the filter cake degradation fluid in the well bore for a longer period of time to further remove the filter cake from the well bore walls over the entire interval length.

In an embodiment, a filter cake degradation fluid may be used to remove the filter cake deposited on the walls of the well bore by well drilling and servicing fluids used to complete the well. As used herein, the term "filter cake degradation fluid" refers to a fluid that is capable of degrading a filter cake deposited on the walls of a well bore by well fluid in a subterranean application. The term "filter cake degradation fluid" does not imply any particular mechanism of degradation or degradation rate.

In one embodiment of the present invention, a filter cake degradation fluidcomprising a water soluble relative permeability modifier, may be used in a filter-cake-cleanup operation. The filter cake degradation fluid may be "spotted" (e.g., selectively located) over a desired filter cake interval and permitted to soak or remain in direct contact with the filter cake for a period of time. Any "pinholes" that may be created in the filter cake by the filter cake degradation fluid will be obstructed at the time of their formation by the relative permeability modifier contacting the well bore wall, thereby permitting the filter cake degradation fluid to remain in the well bore for a greater period of time and evenly clean the entire well bore interval. Without wishing to be limited by theory, it is believed that upon exposure to an aqueous fluid the polymer structure of the relative permeability modifier may branch out into the aqueous phase. The branching out may reduce the size of the pore throat in the formation available to flow and reduce the effective permeability to aqueous fluids. When exposed to hydrocarbon fluids, such as during production from the well bore, the polymer may contract, re-opening the pore space and retaining high effective permeability to hydrocarbons.

The filter cake degradation fluid disclosed herein comprises an aqueous carrier fluid, a solvent, and a fluid loss control agent. A variety of additives suitable for use in a treatment operation may be included in the filter cake degradation fluid as desired.

In an embodiment, the aqueous carrier fluid of the filter cake degradation fluids may include fresh water, saltwater, seawater, brine containing inorganic or organic dissolved salt compounds, mixtures containing water-miscible organic compounds (e.g., an alcohol, a glycerol, a glycol, etc.), or emulsions including an equivalent aqueous component. Generally, the aqueous carrier fluid may be from any source provided that it does not contain components that may adversely affect other components in the filter cake degradation fluid. Generally, the aqueous carrier fluid may be present in an amount sufficient to form a pumpable filter cake degradation fluid. In an embodiment, the aqueous carrier fluid may be present in the filter cake degradation fluid in an amount in the range of from about 5% to about 99% by weight.

The fluid loss control agent present in the filter cake degradation fluid may be a water soluble relative permeability modifier for controlling fluid losses during filter cake removal operations. As used herein, "water soluble" refers to at least 0.01 weight percent soluble in distilled water. The filter cake degradation fluid disclosed herein may be used with an open hole completion, or it may be used with any other type of completions in which a filter cake is deposited in a well bore. In addition, the methods and compositions of the present invention may be utilized in horizontal, vertical, inclined, or otherwise formed portions of wells.

In an embodiment, the fluid loss control agent of the filter cake degradation fluids may be a water soluble relative permeability modifier. As used herein, "relative permeability modifier" refers to a compound that is capable of reducing the permeability of a subterranean formation to aqueous-based fluids without substantially changing its permeability to hydrocarbons. Generally, the water-soluble relative permeability modifiers of the present invention may be any suitable water-soluble relative permeability modifier that is suitable for use in subterranean operations. In some embodiments of the present invention, the water-soluble relative permeability modifiers comprise a hydrophobically modified polymer. As used herein, "hydrophobically modified" refers to the incorporation into the hydrophilic polymer structure of hydrophobic groups, wherein the alkyl chain length is from about 4 to about 22 carbons. In other embodiments of the present invention, the water-soluble relative permeability modifiers comprise a hydrophilically modified polymer. As used herein, "hydrophilically modified" refers to the incorporation into the hydrophilic polymer structure of hydrophilic groups. In yet another embodiment of the present invention, the water-soluble relative permeability modifiers comprise a water-soluble polymer without hydrophobic or hydrophilic modification.

The hydrophobically modified polymers of the present invention typically have molecular weights in the range of from about 100,000 to about 10,000,000. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone, the polymer backbone comprising polar heteroatoms. Generally, the polar heteroatoms present within the polymer backbone of the hydrophobically modified polymers include, but are not limited to, oxygen, nitrogen, sulfur, or phosphorous.

In certain embodiments of the present invention, the hydrophobically modified polymers may be a reaction product of a hydrophilic polymer and a hydrophobic compound. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In certain embodiments of the present invention, the hydrophilic polymers comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, and organic acid derivatives. Examples of suitable organic acid derivatives include, but are not limited to, octenyl succinic acid; dodecenyl succinic acid; and anhydrides, esters, and amides of octenyl succinic acid or dodecenyl succinic acid. In certain embodiments, the hydrophobic compounds may have an alkyl chain length of from about 4 to about 22 carbons. For example, where the hydrophobic compound is an alkyl halide, the reaction between the hydrophobic compound and hydrophilic polymer may result in the quatemization of at least some of the hydrophilic polymer amino groups with an alkyl halide, wherein the alkyl chain length is from about 4 to about 22 carbons.

In other embodiments, the hydrophobically modified polymers used in the present invention may be prepared from the polymerization reaction of at least one hydrophilic monomer and at least one hydrophobically modified hydrophilic monomer. Examples of suitable methods of their preparation are described in U.S. Pat. No. 6,476,169, the relevant disclosure of which is incorporated herein by reference in its entirety.

A variety of hydrophilic monomers may be used to form the hydrophobically modified polymers useful in the present invention. Examples of suitable hydrophilic monomers include, but are not limited to homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

The hydrophobically modified polymers formed from the above-described polymerization reaction may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10. Suitable hydrophobically modified polymers having molecular weights and mole ratios in the ranges set forth above include, but are not limited to, acrylamide/octadecyldimethylammoniumethyl methacrylate bromide copolymer, dimethylaminoethyl methacrylate/hexadecyldimethylammoniumethyl methacrylate bromide copolymer, dimethylaminoethyl methacrylate/vinyl pyrrolidone/hexadecyldimethylammoniumethyl methacrylate bromide terpolymer and acrylamide/2-acrylamido-2-methyl propane sulfonic acid/2-ethylhexyl methacrylate terpolymer.

In other embodiments of the present invention, the water-soluble relative permeability modifiers of the present invention comprise a hydrophilically modified polymer. The hydrophilically modified polymers of the present invention typically have molecular weights in the range of from about 100,000 to about 10,000,000. In certain embodiments, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

In certain embodiments of the present invention, the hydrophilically modified polymer may be a reaction product of a hydrophilic polymer and a hydrophilic compound. The hydrophilic polymers suitable for forming the hydrophilically modified polymers used in the present invention should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers that comprise halogens; sulfonates; sulfates; and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

In yet other embodiments of the present invention, the water-soluble relative permeability modifiers comprise a water-soluble polymer without hydrophobic or hydrophilic modification. Examples of suitable water-soluble polymers without hydrophobic or hydrophilic modification include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

Sufficient concentrations of a suitable water-soluble relative permeability modifier should be present in the filter cake degradation fluids to provide the desired level of fluid loss control. In some embodiments, the water-soluble relative permeability modifier may be included in the filter cake degradation fluids of the present invention in an amount in the range of from about 0.01% to about 30% by volume of the filter cake degradation fluid. Even further, in certain embodiments, the water-soluble relative permeability modifier may be present in the filter cake degradation fluids of the present invention in an amount in the range of from about 1.0% to about 20% by volume of the filter cake degradation fluid. In certain embodiments of the present invention, the water-soluble relative permeability modifier may be provided in a concentrated aqueous solution prior to its combination with the other components necessary to form the filter cake degradation fluids of the present invention.

In an embodiment, the solvent of the filter cake degradation fluid may be any substance capable of degrading a component of the filter cake. The choice of solvent will depend on the filter cake composition, the filter cake degradation fluid composition, and formation conditions (e.g., formation temperature, formation pressure). A wide variety of solvents may be used with the filter cake degradation fluid. For example, the solvent may be an acid, a degradable material capable of producing an acid in the well bore, an enzyme, a chelating agent, an oxidizer, or any combination thereof. In an embodiment, the use of the filter cake degradation fluids disclosed herein may allow for the use of a strong solvent, such as a relatively strong mineral acid. In this embodiment, the use of the relative permeability modifier may maintain the strong solvent in the well bore for a longer period of time and allow more of the filter cake to be degraded. In addition, the use of the relative permeability modifier may prevent damage to the formation from an aqueous based solvent, even when the solvent is a strong acid.

In an embodiment, the solvent may be an acid or a mixture of acids. A variety of acids can be used in conjunction with the methods and compositions of the present invention. Examples of suitable acids include, but are not limited to, hydrochloric acid, formic acid, acetic acid, citric acid, glycolic acid, hydroxyacetic acid, lactic acid, hydrofluoric acid, adipic acid, succinic acid, phosphoric acid, phosphonic acid, tartaric acid, glutaric acid, 3-hydroxypropionic acid, carbonic acid, ethylenediaminetetraacetic acid, erythorbic acid, or any combination thereof. An example of a suitable commercially available acid is "Volcanic Acid II™" available from Halliburton Energy Services, Inc. Alternatively or in combination with one or more acids, the treatment fluids of the present invention may comprise a salt of a acid. A "salt" of an acid, as that term is used herein, refers to any compound that shares the same base formula as the referenced acid, but one of the hydrogen cations thereon is replaced by a different cation (e.g., an antimony, bismuth, potassium, sodium, calcium, magnesium, cesium, or zinc cation). Examples of suitable salts of acids include, but are not limited to, sodium acetate, sodium formate, sodium citrate, sodium hydroxyacetate, sodium lactate, sodium fluoride, sodium propionate, sodium carbonate, calcium acetate, calcium formate, calcium citrate, calcium hydroxyacetate, calcium lactate, calcium fluoride, calcium propionate, calcium carbonate, cesium acetate, cesium formate, cesium citrate, cesium hydroxyacetate, cesium lactate, cesium fluoride, cesium propionate, cesium carbonate, potassium acetate, potassium formate, potassium citrate, potassium hydroxyacetate, potassium lactate, potassium fluoride, potassium propionate, potassium carbonate, magnesium acetate, magnesium formate, magnesium citrate, magnesium hydroxyacetate, magnesium lactate, magnesium fluoride, magnesium propionate, magnesium carbonate, zinc acetate, zinc formate, zinc citrate, zinc hydroxyacetate, zinc lactate, zinc fluoride, zinc propionate, zinc carbonate, antimony acetate, antimony formate, antimony citrate, antimony hydroxyacetate, antimony lactate, antimony fluoride, antimony propionate, antimony carbonate, bismuth acetate, and bismuth formate, bismuth citrate, bismuth hydroxyacetate, bismuth lactate, bismuth fluoride, bismuth carbonate, and bismuth propionate. The treatment fluids of the present invention may comprise any combination of acids and/or salts thereof. The acid, or salts thereof, may be present in an amount in the range of from about 0.1% by weight of the treatment fluid to about 30% by weight of the treatment fluid. In another embodiment, the acid, or salts thereof, may be present in an amount ranging from about 1% to about 20%. The amount of an acid, or salts thereof, included in a particular treatment fluid of the present invention may depend upon the particular acid and/or salt used, as well as other components of the treatment fluid, and/or other factors that will be recognized by one of ordinary skill in the art with the benefit of this disclosure.

In an embodiment, the solvent may be an acid-releasing material capable of generating an acid in the well bore. For example, degradable polymers may be capable of releasing acids upon degradation in the well bore. Polymers suitable for use as an acid-releasing degradable material may be considered degradable if the degradation is due, inter alia, to chemical and/or radical process such as hydrolysis, oxidation, or enzymatic decomposition. The degradability of a polymer depends at least in part on its backbone structure, type of repetitive unit, composition, sequence, length, molecular geometry, molecular weight, morphology (e.g., crystallinity, size of spherulites, and orientation), hydrophilicity, hydrophobicity, surface area, and additives. Also, the environment to which the polymer is subjected may affect how it degrades, e.g., temperature, presence of moisture, oxygen, microorganisms, enzymes, pH, and the like.

In an embodiment, acid-releasing degradable materials that may be used in conjunction with the present invention are those materials that may be substantially water insoluble such that they may degrade over time to produce an acid. Materials suitable for use as an acid-releasing degradable material may be considered degradable if the degradation is due, inter alia, to chemical processes, such as hydrolysis, oxidation, or enzymatic decomposition. Examples of suitable acid-releasing degradable materials include substantially water insoluble esters such as ortho esters; poly(orthoesters); aliphatic polyesters; lactides, poly(lactides); glycolides; poly(glycolides); poly($\epsilon$-caprolactone); poly(hydroxybutyrate); substantially water insoluble anhydrides; poly(anhydrides); poly(amino acids); triethyl citrate; dimethyl glutarate; dimethyl succinate; and dimethyl adipate. The degradable materials may release a number of acids upon degradation that may be useful in dissolving a filter cake. For example, ortho esters, poly (orthoesters), or a combination of the two may degrade to release acetic acid, formic acid, or a combination of the two. In another embodiment, a wide variety of formate esters may be used in the filter cake degradation fluids to release acids. Examples of suitable formate esters include, but are not limited to, ethylene glycol monoformate, monoethylene glycol diformate, diethylene glycol diformate, glyceryl monoformate, glyceryl diformate, glyceryl triformate, triethylene glycol diformate and formate esters of pentaerythritol. Blends of certain acid-releasing degradable materials may also be suitable. Examples of a suitable blend of materials includes a blend of a poly(lactic acid) and lactide or a poly(lactic acid) and an ortho ester. Other materials that undergo degradation and produce acid may also be suitable, if the products of the degradation do not undesirably interfere with either the subterranean treatment being performed or the subterranean formation. It is within the ability of one skilled in the art, with the benefit of this disclosure, to select a suitable acid-releasing degradable material. When used, a hydrolyzable ester or a blend of acid releasing degradable materials may generally be included in the filter cake degradation fluid in an amount in the range of from about 0.1% to about 30% by weight of the filter cake degradation fluid.

In another embodiment, the solvent may be an enzyme capable of dissolving at least a portion of the filter cake. For example, some filter cakes may contain hydratable polymers, such as polysaccharide gels or crosslinking agents. Examples of hydratable polysaccharide gels include, but are not limited to, the galactomannan gums, guars, derivatized guars, starch, cellulose and cellulose derivatives. Enzymes capable of breaking up or dissolving filter cake components such as starch or cellulose include, but are not limited to, hydrolase enzymes, xanthanse enzymes, amylase enzymes, endo-amylase enzymes, exo-amylases, isoamylases, glucosidases, proteinase-K, any combination thereof, or any other enzyme known to degrade a component of a filter cake. In certain embodiments of the present invention, an enzyme or its derivative may be encapsulated by means known in the art to affect a delayed release upon introduction into the well bore. Enzymes may also be used to degrade the degradable materials included in the filter cake degradation fluid to generate acids, which may further degrade the filter cake. For example, enzymes may be used to degrade an orthoester to generate an acetic or formic acid, which may further degrade at least a portion of the filter cake. In an embodiment, an enzyme may be present in an amount ranging from about 0.1% to about 10% by weight of the filter cake degradation fluid. In another embodiment, an enzyme may be present in an amount ranging from about 0.1% to about 5% by weight of the filter cake degradation fluid. In still another embodiment, an enzyme may be present in an amount ranging from about 0.1% to about 2% by weight of the filter cake degradation fluid.

In an embodiment, the solvent of the filter cake degradation fluid may be a chelating agent. A variety of chelating agents can be utilized in the filter cake degradation fluid to degrade certain bridging agents in the filter cake. The term "chelating agent" is used herein to mean a chemical that will form a water-soluble complex with the cationic portion of the bridging agent to be degraded. Various chelating agents can be utilized including, but not limited to, ethylenediaminetetraacetic acid (EDTA) and salts thereof, nitrilotriacetic acid (NTA) and salts thereof, diethylenetriaminepentaacetic acid (DTPA) and salts thereof, trans-1,2-diaminocyclohexane-N, N,N',N'-tetraacetic acid (DCTA) and salts thereof, citric acid and salts thereof, diglycolic acid and salts thereof, phosphonic acid and salts thereof, aspartic acid and its polymers and mixtures thereof. The chelating agent utilized is generally included in the filter cake degradation fluid in an amount in the range of from about 0.1% to about 60% by weight of the filter cake degradation fluid.

In an embodiment, the solvent may be an oxidizer or other breaker which functions to oxidize and degrade polymeric based components in the filter cake. In some embodiments, the degrading of the polymeric materials allows the particulate solid bridging agent to be degraded by the filter cake degradation fluid in a shorter period of time. Generally, any oxidizer or other breaker that may be deposited with the filter cake or introduced with the filter cake degradation fluid may be utilized. In an embodiment, examples of suitable oxidizers may include, but are not limited to, hydrogen peroxide, magnesium peroxide, magnesium peroxydiphosphate, strontium peroxide, barium peroxide, calcium peroxide, magnesium perborate, barium bromate ammonium persulfate, sodium persulfate, potassium permanganate, sodium bromate, sodium perforate, potassium iodate, potassium periodate, sodium chlorite, sodium hypochlorite, lithium hypochlorite, calcium hypochlorite, or any combination thereof. Oxidizers or other breakers may be encapsulated with a material that may be soluble in the filter cake degradation fluid. The oxidizer or breaker utilized may generally be included in the filter cake degradation fluid in an amount in the range of from about 0.1% to about 6% by weight of the filter cake degradation fluid.

Additional additives may be added to the filter cake degradation fluids of the present invention as deemed appropriate for a particular application by one skilled in the art with the benefit of this disclosure. Examples of such additives include, but are not limited to, surfactants, foaming agents, corrosion inhibitors, iron reducers, gel breakers, activators, retarders, conventional fluid loss control additives, scale inhibitors, salts, crosslinkers, stabilizers, bactericides, weighting agents, antifoaming agents, viscosifying agents, shale swelling inhibitors, clay modifiers, and combinations thereof. Any additive may be used that does not have a detrimental effect on the other components of the fluid. A test may be performed prior to adding an additive in order to determine the compatibility with the filter cake degradation fluid.

In some embodiments, the filter cake degradation fluids of the present invention may include surfactants, e.g., to improve the compatibility of the filter cake degradation fluids with other fluids (like any formation fluids) that may be present in the subterranean formation. In an embodiment, a surfactant may be used to enhance the reactivity of the filter cake degradation fluid by, for example, breaking any emulsions present from the drilling fluid system or improving the interfacial interactions between the filter cake and the fluid thereby allowing the fluid to contact the filter cake more easily. A person of ordinary skill, with the benefit of this disclosure, will be able to identify the type of surfactant as well as the appropriate concentration of surfactant to be used. Examples of surfactants that may be suitable include, but are not limited to, ethoxylated nonyl phenol phosphate esters, nonionic surfactants, cationic surfactants, anionic surfactants, amphoteric/zwitterionic surfactants, alkyl phosphonate surfactants, linear alcohols, nonylphenol compounds, alkyoxylated fatty acids, alkylphenol alkoxylates, ethoxylated amides, ethoxylated alkyl amines, betaines, methyl ester sulfonates (e.g., as described in U.S. Patent Application Nos. 2006/0180310, 2006/0180309, 2006/0183646 and U.S. Pat. No. 7,159,659, the relevant disclosures of which are incorporated herein by reference), hydrolyzed keratin (e.g., as described in U.S. Pat. No. 6,547,871, the relevant disclosure of which is incorporated herein by reference), sulfosuccinates, taurates, amine oxides, alkoxylated fatty acids, alkoxylated alcohols (e.g., lauryl alcohol ethoxylate, ethoxylated nonyl phenol), ethoxylated fatty amines, ethoxylated alkyl amines (e.g., cocoalkylamine ethoxylate), betaines, modified betaines, alkylamidobetaines (e.g., cocoamidopropyl betaine), quaternary ammonium compounds (e.g., trimethyltallowammonium chloride, trimethylcocoammonium chloride), derivatives thereof, and mixtures thereof. Suitable surfactants may be used in a liquid or powder form.

In an embodiment, the surfactants may be present in the filter cake degradation fluids in an amount sufficient to prevent incompatibility with formation fluids or well bore fluids. In an embodiment where liquid surfactants are used, the surfactants may be present in an amount in the range of from about 0.01% to about 5.0% by volume of a filter cake degradation fluid. In one embodiment, the liquid surfactants are present in an amount in the range of from about 0.01% to about 2.0% by volume of a filter cake degradation fluid. In embodiments where powdered surfactants are used, the surfactants may be present in an amount in the range of from about 0.001% to about 0.5% by weight of a filter cake degradation fluid. Examples of surfactants that may be suitable include non-emulsifiers commercially available from Halliburton Energy Services, Inc., of Duncan, Okla., under the tradenames "LOSURF-300M™" nonionic surfactant, "LOSURF-357™" nonionic surfactant, "LOSURF-400™" surfactant, "LOSURF-2000S™" solid surfactant, "LOSURF-2000M™" solid surfactant, and "LOSURF-259™" nonionic non-emulsifier. Another example of a surfactant that may be suitable is a non-emulsifier commercially available from Halliburton Energy Services, Inc., of Duncan, Okla., under the tradename "NEA-96M™" Surfactant. Other examples of surfactants that may be suitable that are commercially available from Halliburton Energy Services in Duncan, Okla. are products "SGA-1," "EFS-1," "EFS-2," "EFS-3," and "EFS-4." Other surfactants that may be suitable may include betaines and quaternary ammonium compounds. Examples of betaines that are commercially available include MIRATAINE™ and MIRATAINE™ BET O-30 both available for Rhodia and REWOTERIC™ AM TEG available from Degussa. Examples of commercially available quaternary ammonium compounds include ARQUAD™ 22-80 and ETHOQUAD™ O/12 PG both available from Akzo Nobel and GENAMIN KDMP available from Clariant. It may be beneficial to add a surfactant to the filter cake degradation fluids as that fluid is being pumped downhole, among other things, to help reduce the possibility of forming emulsions with the formation crude oil or injection fluids. Furthermore, in some embodiments, microemulsion additives optionally may be included in the filter cake degradation fluids. Examples of microemulsion additives that may be suitable include, but are not limited to, "PEN-88M™" surfactant, "PEN-88HT™" surfactant, "SSO-21E" surfactant, "SSO-21MW™" surfactant, GASPERM 1000™ Microemulsion Surfactant/Solvent Additive, which are all commercially available from Halliburton Energy Services, Inc., of Duncan, Okla. Other microemulsion additives that may be suitable include, but are not limited to, MA-845 additive and MA-844 additive, commercially available from CESI Chemical of Duncan, Okla.; SHALESURF 1000 additive, commercially available from Frac. Tech Services of Aledo, Tex.; and those disclosed in U.S. Patent App. No. 2003/0166472, the relevant disclosure of which is incorporated by reference.

It should be noted that, in some embodiments, it may be beneficial to add a surfactant to a filter cake degradation fluid as that fluid is being pumped downhole to help eliminate the possibility of foaming. However, in those embodiments where it is desirable to foam the filter cake degradation fluid, surfactants such as HY-CLEAN (HC-2)™ surface-active suspending agent or AQF-2™ additive, both commercially available from Halliburton Energy Services, Inc., of Duncan, Okla., may be used. Additional examples of foaming agents that may be utilized to foam and stabilize the filter cake degradation fluids, but are not limited to, betaines, amine oxides, methyl ester sulfonates, alkylamidobetaines such as cocoamidopropyl betaine, alpha-olefin sulfonate, trimethyltallowammonium chloride, $C_8$ to $C_{22}$ alkylethoxylate sulfate and trimethylcocoammonium chloride. Other suitable surfactants that may or may not be foamers in a particular application that are available from Halliburton Energy Services include: 19N, G-SPERSE dispersant, HOWCO-SUDS™ foaming agent, and A-SPERSE™ dispersing aid for acid additives. Other suitable foaming agents and foam stabilizing agents may be included as well, which will be known to those skilled in the art with the benefit of this disclosure.

Examples of corrosion inhibitors that may be suitable for use include, but are not limited to, acetylenic alcohols, Mannich condensation products (such as those formed by reacting an aldehyde, a carbonyl containing compound and a nitrogen containing compound), unsaturated carbonyl compounds, unsaturated ether compounds, formamide, formic acid, formates, other sources of carbonyl, iodides, terpenes, and aromatic hydrocarbons, coffee, tobacco, gelatin, cinnamaldehyde, cinnamaldehyde derivatives, acetylenic alcohols, fluorinated surfactants, quaternary derivatives of heterocyclic nitrogen bases, quaternary derivatives of halomethylated aromatic compounds, formamides, combinations of such compounds used in conjunction with iodine, quaternary ammonium compounds, and combinations thereof. Corrosion inhibitors that may be suitable are available from Halliburton Energy Services and include, but are not limited to: "MSA II™" corrosion inhibitor, "MSA III™" corrosion inhibitor, "HAI-404M™" acid corrosion inhibitor, "HAI-81M™" Acid corrosion inhibitor, "HAI-85M™" Acid corrosion inhibitor, "HAI-202 Environmental Corrosion Inhibitor," "HAI-OS"

Corrosion Inhibitor, "HAI-GE" Corrosion Inhibitor, and "FDP-S692-03" Corrosion inhibitor for organic acids. In certain embodiments, a corrosion inhibitor activator may be included. Examples of corrosion inhibitor activators that may be used include, but are not limited to, cuprous iodide; cuprous chloride; antimony compounds such as antimony oxides, antimony halides, antimony tartrate, antimony citrate, alkali metal salts of antimony tartrate and antimony citrate, alkali metal salts of pyroantimonate and antimony adducts of ethylene glycol; bismuth compounds such as bismuth oxides, bismuth halides, bismuth tartrate, bismuth citrate, alkali metal salts of bismuth tartrate and bismuth citrate; iodine; iodide compounds; formic acid; and mixtures of the foregoing activators such as a mixture of formic acid and potassium iodide. Corrosion inhibitors intensifiers that may be suitable are available from Halliburton Energy Services and include: "HII-500™" Corrosion inhibitor intensifier, "HII-500M™" Corrosion inhibitor intensifier, "HII-124B" Acid inhibitor intensifier, "HII-124C™" Inhibitor intensifier, and "HII-124F™" corrosion inhibitor intensifier. The amount of a corrosion inhibitor to include in an acidic treatment fluid of the present invention will depend on many factors, including but not limited to, the metallurgy the acid will contact, contact time, temperature, other acid blend additives, etc. Where included, the amount of a corrosion inhibitor to include may range from about 0.1% to about 3% by volume where liquid products are used and from about 0.5% to about 200% by weight where solid products are used.

Suitable iron control agents are available from Halliburton Energy Services and include: "FE-2™" Iron sequestering agent, "FE-2A™" Buffering agent, "FE-3™" Iron control agent, "FE-3A™" Iron control agent, "FE-5A™" Iron control agent, "FERCHEK®" Ferric iron inhibitor, "FERCHEK® A" Reducing agent, and "FERCHEK® SC" Iron control system. Other suitable iron control agents include those described in U.S. Pat. Nos. 6,315,045, 6,525,011, 6,534,448, and 6,706,668, the relevant disclosures of which are hereby incorporated by reference.

While typically not required, the filter cake degradation fluids may comprise breakers capable of reducing the viscosity of the filter cake degradation fluids at a desired time. Examples of such breakers that may be suitable for the filter cake degradation fluids include, but are not limited to, sodium chlorite, hypochlorites, perborates, persulfates, peroxides (including organic peroxides), enzymes, derivatives thereof, and combinations thereof. Other suitable breakers may include suitable acids. Examples of peroxides that may be suitable include tert-butyl hydroperoxide and tert-amyl hydroperoxide. A breaker may be included in an filter cake degradation fluid in an amount and form sufficient to achieve the desired viscosity reduction at a desired time. The breaker may be formulated to provide a delayed break, if desired. For example, a suitable breaker may be encapsulated if desired. Suitable encapsulation methods are known to those skilled in the art. One suitable encapsulation method that may be used involves coating the breaker(s) with a material that will degrade when placed downhole so as to release the breaker at the appropriate time. Coating materials that may be suitable include, but are not limited to, polymeric materials that will degrade when downhole. The terms "degrade," "degradation," or "degradable" refer to both the two relatively extreme cases of hydrolytic degradation that the degradable material may undergo, i.e., heterogeneous (or bulk erosion) and homogeneous (or surface erosion), and any stage of degradation in between these two. This degradation can be a result of, inter alia, a chemical or thermal reaction, a reaction induced by radiation, or enzymatic decomposition. Suitable examples of materials that can undergo such degradation include polysaccharides such as dextran or cellulose; chitins; chitosans; proteins; aliphatic polyesters; poly(lactides); poly(glycolides); poly(ε-caprolactones); poly(hydroxybutyrates); poly(anhydrides); aliphatic polycarbonates; orthoesters, poly(orthoesters); poly(amino acids); poly(ethylene oxides); polyphosphazenes; derivatives thereof; and combinations thereof. If used, a breaker should be included in a composition of the present invention in an amount sufficient to facilitate the desired reduction in viscosity in a viscosified treatment fluid. For instance, peroxide concentrations that may be used vary from about 0.1 to about 10 gallons of peroxide per 1000 gallons of a filter cake degradation fluid.

In an embodiment, a filter cake degradation fluid may contain an activator or a retarder, inter alia, to optimize the rate at which the fluid is "broken" (i.e., the viscosity of the fluid is reduced). Any known activator or retarder that is compatible with the fluid and the components thereof is suitable for use in the present invention. Examples of such activators that may be suitable include, but are not limited to, acid generating materials, chelated iron, copper, cobalt, reducing sugars, derivatives thereof, and combinations thereof. Examples of retarders that may be suitable include sodium thiosulfate and diethylene triamine. In some embodiments, the sodium thiosulfate may be used in a range of from about 1 to about 100 lbs per 1000 gallons of acidic treatment fluid. A preferred concentration range may be from about 5 to about 20 lbs per 1000 gallons. A person of ordinary skill with the benefit of this disclosure will be able to identify a suitable activator or retarder and the proper concentration of such activator or retarder for a given application.

The filter cake degradation fluids also may comprise an additional fluid loss control agents. Any fluid loss agent that is compatible with a filter cake degradation fluid may be suitable. Examples include, but are not limited to, starches, silica flour, and diesel dispersed in a fluid. Other examples of fluid loss control additives that may be suitable are those that comprise a degradable material. Suitable degradable materials include degradable polymers. Specific examples of suitable polymers include polysaccharides such as dextran or cellulose; chitins; chitosans; proteins; aliphatic polyesters; poly(lactides); poly(glycolides); poly(glycolide-co-lactides); poly(ε-caprolactones); poly(3-hydroxybutyrates); poly(3-hydroxybutyrate-co-hydroxyvalerates); poly(anhydrides); aliphatic poly(carbonates); poly(orthoesters); poly (amino acids); poly(ethylene oxides); poly(phosphazenes); derivatives thereof; or combinations thereof. If included, a fluid loss additive should be added to a filter cake degradation fluid in an amount of about 5 to about 2000 pounds per 1000 gallons of a filter cake degradation fluid. In certain embodiments, the fluid loss additive may be included in an amount from about 10 to about 50 pounds per 1000 gallons of a filter cake degradation fluid. For some liquid additives like diesel, these may be included in an amount from about 0.01% to about 20% by volume; in some embodiments, these may be included in an amount from about 1% to about 10% by volume.

Scale inhibitors optionally may be added to the filter cake degradation fluids, for example, when a filter cake degradation fluid is not particularly compatible with the formation waters in the formation or injection fluids in which it is being used. Any scale inhibitor that is compatible with the filter cake degradation fluid in which it will be used may be suitable. This may include water soluble organic molecules with carboxylic acid, aspartic acid, maleic acids, sulphonic acids, phosphonic acid and phosphate esters groups including copolymers, ter-polymers, grafted copolymers, derivatives thereof, and combinations thereof. Examples of such compounds include aliphatic phosphonic acids such as diethylene triamine penta (methylene phosphonate) and polymeric species such as polyvinylsulphonate. The scale inhibitor may be in the form of the free acid, or may be in the form of mono- and polyvalent cation salts such as those comprising $Na^+$, $K^+$, $Al^+$, $Fe^+$, $Ca^+$, $Mg^+$, $NH_4^+$ cations. An example of a preferred scale inhibitor is "SCALECHECK® LP-55 Scale Inhibitor" from Halliburton Energy Services in Duncan, Okla. Another example of a preferred scale inhibitor is "LP-65™ Scale Inhibitor" available from Halliburton Energy Services in Duncan, Okla. If used, a scale inhibitor should be included in an amount effective to inhibit scale formation. For some applications, suitable amounts of scale inhibitors that may be included in a filter cake degradation fluid may range from about 0.05 to 100 gallons per about 1000 gallons of a filter cake degradation fluid.

Salts optionally may be included in the filter cake degradation fluids for many purposes, including adjusting the density of the fluid. One of ordinary skill in the art with the benefit of this disclosure will recognize the particular type of salt appropriate for particular application, given considerations such as protection of the formation, the presence or absence of reactive clays in the formation adjacent to the well bore, compatibility with the other acidic treatment fluid additives, and the factors affecting wellhead control. To determine whether a salt may be used, a compatibility test may be performed to identify potential compatibility problems. From such tests, one of ordinary skill in the art with the benefit of this disclosure will be able to determine whether a salt should be included in an acidic treatment fluid of the present invention, as well as the appropriate selection of salts. Suitable salts may include, but are not limited to, calcium bromide, zinc bromide, calcium chloride, sodium chloride, sodium bromide, potassium bromide, potassium chloride, sodium nitrate, sodium formate, potassium formate, cesium formate, magnesium chloride, ammonium chloride, derivatives thereof, mixtures thereof, and the like.

The filter cake degradation fluids of the present invention may comprise a suitable crosslinker. Crosslinking may be desirable at higher temperatures and/or when the sand suspension properties of a particular fluid of the present invention may need to be altered for a particular purpose. Suitable crosslinkers include, but are not limited to, boron derivatives; potassium derivatives, including but not limited to, potassium periodate or potassium iodate; ferric iron derivatives; magnesium derivatives; and the like. Any crosslinker that is compatible with the gelling agent may be suitable for use in the present invention. One of ordinary skill in the art, with the benefit of this disclosure, will recognize when such crosslinkers are appropriate and what particular crosslinker will be most suitable. Typically, a crosslinking agent may be included in an amount of from about 0.01 lb/Mgal to about 15 lb/Mgal.

The filter cake degradation fluids optionally may comprise a stabilizer, for example, if a chosen acidic treatment fluid of the present invention is experiencing a viscosity degradation. One example of a situation where a stabilizer might be beneficial is where the borehole temperature of the well bore is sufficient by itself to break the filter cake degradation fluid. Suitable stabilizers may include, but are not limited to, sodium thiosulfate. Such stabilizers may be useful, for example, when the filter cake degradation fluids are utilized in a subterranean formation having a temperature above about 150° F. If included, a stabilizer may be added in an amount from about 1 lb to about 50 lb per 1000 gal of filter cake degradation fluid. In other embodiments, a stabilizer may be included in an amount of from about 5 to about 20 lb per 1000 gal of filter cake degradation fluid.

In some embodiments, the filter cake degradation fluids of the present invention may contain bactericides, inter alia, to protect both the subterranean formation as well as the filter cake degradation fluids from attack by bacteria. Such attacks may be problematic because they may lower the viscosity of a filter cake degradation fluid, resulting in poorer performance, such as poorer sand suspension properties, for example. Any bactericides known in the art are suitable. An artisan of ordinary skill with the benefit of this disclosure will be able to identify a suitable bactericide and the proper concentration of such bactericide for a given application. Examples of suitable bactericides include, but are not limited to, a 2,2-dibromo-3-nitrilopropionamide, commercially available under the tradename BE-3S™ biocide from Halliburton Energy Services, Inc., of Duncan, Okla., and a 2-bromo-2-nitro-1,3-propanediol commercially available under the tradename BE-6™ biocide from Halliburton Energy Services, Inc., of Duncan, Okla. In one embodiment, the bactericides are present in the acidic treatment fluid in an amount in the range of from about 0.001% to about 1.0% by weight of the filter cake degradation fluid. In certain embodiments, when bactericides are used in a filter cake degradation fluid, they may be added to the filter cake degradation fluid before the gelling agent is added.

An example of a method of the present invention is a method of treating a subterranean formation, comprising: providing a well bore in a subterranean formation that includes a filter cake on at least a portion of the well bore; contacting at least a portion of the filter cake with a filter cake degradation fluid comprising a relative permeability modifier; permitting the relative permeability modifier to retain the filter cake degradation fluid within the well bore for a time sufficient to degrade the filter cake to a desired degree; and producing the well to remove the fluids.

Another example of a method of the present invention is a method of drilling in a subterranean formation, comprising: using a drilling fluid to drill a well bore in a subterranean formation; permitting the drilling fluid to establish a filter cake in at least a portion of the well bore; contacting at least a portion of the filter cake with a filter cake degradation fluid comprising a relative permeability modifier; and permitting the filter cake to degrade. In this method, the well bore completed in the subterranean formation may be an open hole completion. In another embodiment, the method may be used in a well bore prior to placing and cementing casing in the well bore.

If necessary, a suitable wash solution may be circulated through the well bore in the producing or injecting formation to wash any remaining filter cake from the walls of the well bore. Generally, the wash solution utilized should be an aqueous solution which does not adversely affect the permeability of the formation. Thus, the washing solution may be an aqueous solution containing a relative permeability modifier.

Among other things, subsequent remedial treatments should not be required to remove the relative permeability modifier prior to placing the well into production. If desired, however, oxidizers may be used to remove the water-soluble polymer. For example, it may be desired, in some instances, to remove the water-soluble polymers so that fluids subsequently introduced into the formation can enter the formation. Examples of suitable oxidizers include, but are not limited to, alkali, alkaline earth, and transition metal salts of periodate, hypochlorite, perbromate, chlorite, chlorate; hydrogen peroxide; manganese peroxide; peracetic acid; and combinations thereof.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an," as used in the claims, are defined herein to mean one or more than one of the element that it introduces. Also, the terms in the claims have their plain, ordinary meaning unless otherwise explicitly and clearly defined by the patentee.

What is claimed is:

1. A method of treating a subterranean formation comprising:
   providing a well bore that includes a filter cake on at least a portion of the well bore;
   contacting at least a portion of the filter cake with a filter cake degradation fluid comprising an aqueous carrier fluid, a solvent, and a relative permeability modifier;
   allowing the relative permeability modifier to retain at least a portion of the filter cake degradation fluid in the well bore for a time sufficient to contact the filtercake; and
   allowing the filter cake degradation fluid to degrade the filter cake.

2. The method of claim 1 wherein the relative permeability modifier is a hydrophobically modified polymer.

3. The method of claim 2 wherein the hydrophobically modified polymer is a reaction product of a hydrophobic compound and a hydrophilic polymer, or is synthesized from a polymerization reaction that comprises a hydrophilic monomer and a hydrophobically modified hydrophilic monomer.

4. The method of claim 3 wherein the hydrophilic polymer is selected from the group consisting of: a polyacrylamide; a polyvinylamine; a poly(vinylamine/vinyl alcohol); an alkyl acrylate polymer; a cellulose; a chitosan; a polyamide; a polyetheramine; a polyethyleneimine; a polyhydroxyetheramine; a polylysine; a polysulfone; a gum; a starch; and derivatives thereof.

5. The method of claim 1 wherein the relative permeability modifier is a hydrophilically modified polymer.

6. The method of claim 5 wherein the hydrophilically modified polymer is a reaction product of a hydrophilic polymer and a hydrophilic compound.

7. The method of claim 6 wherein the hydrophilic polymer comprises a polymer backbone and a reactive amino group in the polymer backbone or as a pendant group, the reactive amino group capable of reacting with the hydrophobic compound.

8. The method of claim 6 wherein the hydrophilic polymer is selected from the group consisting of: a polyacrylamide; a polyvinylamine; a poly(vinylamine/vinyl alcohol); an alkyl acrylate polymer; a cellulose; a chitosan; a polyamide; a polyetheramine; a polyethyleneimine; a polyhydroxyetheramine; a polylysine; a polysulfone; a gum; a starch; and derivatives thereof.

9. The method of claim 6 wherein the hydrophilic compound is selected from the group consisting of: a polyether comprising a halogen; a sulfonate; a sulfate; an organic acid; and an organic acid derivative.

10. The method of claim 1 wherein the relative permeability modifier is present in an amount from about 0.01% to about 20% by volume of the filter cake degradation fluid.

11. The method of claim 1 wherein the filter cake degradation fluid further comprises a solvent, wherein the solvent comprises at least one component selected from the group consisting of: an acid, a degradable material, an enzyme, a chelating agent, an oxidizer, and a derivative thereof.

12. The method of claim 1 wherein the well bore is an open hole completion.

13. A method of degrading a filter cake in a subterranean formation comprising:
    contacting at least a portion of a filter cake with a filter cake degradation fluid comprising an aqueous carrier fluid, a solvent, and a relative permeability modifier; and
    allowing the filter cake degradation fluid to degrade the filter cake.

14. The method of claim 13 wherein the relative permeability modifier comprises at least one component selected from the group consisting of: a hydrophobically modified polymer, and a hydrophilically modified polymer.

15. The method of claim 14 wherein the hydrophobically modified polymer is a reaction product of a hydrophobic compound and a hydrophilic polymer, or is synthesized from a polymerization reaction that comprises a hydrophilic monomer and a hydrophobically modified hydrophilic monomer.

16. The method of claim 14 wherein the hydrophilically modified polymer is a reaction product of a hydrophilic polymer and a hydrophilic compound, wherein the hydrophilic polymer comprises a polymer backbone and a reactive amino group in the polymer backbone or as a pendant group, the reactive amino group capable of reacting with the hydrophobic compound.

17. The method of claim 13 wherein the well bore is an open hole completion.

18. A method of drilling a well bore comprising:
    using a drilling fluid to drill a well bore in a subterranean formation;
    permitting the drilling fluid to establish a filter cake in at least a portion of the well bore;
    contacting at least a portion of the filter cake with a filter cake degradation fluid comprising an aqueous carrier fluid, a solvent, and a relative permeability modifier; and
    permitting the filter cake degradation fluid to degrade the filter cake.

19. The method of claim 18 wherein the well bore is an open hole completion.

20. The method of claim 18 wherein the relative permeability modifier comprises at least one component selected from the group consisting of: a hydrophobically modified polymer, and a hydrophilically modified polymer.

* * * * *